United States Patent
Dupouy et al.

(10) Patent No.: US 10,376,995 B2
(45) Date of Patent: Aug. 13, 2019

(54) TIN-ANTIMONY-BASED HIGH TEMPERATURE SOLDER FOR DOWNHOLE COMPONENTS

(71) Applicant: Schlumberger Technology Corporation, Sugar Land, TX (US)

(72) Inventors: Francis Dupouy, Stonehouse (GB); Mark Kostinovsky, Houston, TX (US); Suriyakan Vongtragool Kleitz, Houston, TX (US); Chandradip Pravinbhai Patel, Stafford, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 79 days.

(21) Appl. No.: 15/104,179

(22) PCT Filed: Dec. 12, 2014

(86) PCT No.: PCT/US2014/070145
§ 371 (c)(1),
(2) Date: Jun. 13, 2016

(87) PCT Pub. No.: WO2015/089470
PCT Pub. Date: Jun. 18, 2015

(65) Prior Publication Data
US 2016/0311065 A1    Oct. 27, 2016

Related U.S. Application Data

(60) Provisional application No. 61/915,879, filed on Dec. 13, 2013.

(51) Int. Cl.
*B23K 35/26* (2006.01)
*E21B 10/25* (2006.01)
(Continued)

(52) U.S. Cl.
CPC .......... *B23K 35/262* (2013.01); *B23K 1/0008* (2013.01); *B23K 35/025* (2013.01);
(Continued)

(58) Field of Classification Search
CPC ................ B23K 35/262; B23K 1/0008; B23K 2201/002; E21B 10/52; E21B 10/567;
(Continued)

(56) References Cited

U.S. PATENT DOCUMENTS 6,047,876 A * 4/2000 Smith ...................... B23K 1/06
                                                    228/111.5
6,367,683 B1 * 4/2002 Rass ....................... B23K 35/26
                                                    228/111.5
(Continued)

FOREIGN PATENT DOCUMENTS

JP         11216591 A  *  8/1999
JP       2009255176 A     5/2009
WO     WO-0134860 A1  *  5/2001 ........... B23K 35/262

OTHER PUBLICATIONS

Patel et al, U.S. Appl. No. 61/807,193, "High Temperature Solder for Downhole Components," filed Apr. 1, 2013.
(Continued)

*Primary Examiner* — Zakiya W Bates (57) ABSTRACT

A downhole tool conveyable within a wellbore extending into a subterranean formation, wherein the downhole tool comprises a first component, a second component, and a solder electrically and mechanically coupling the first and second components, wherein the solder comprises or consists of: from 9.6 to 10.2 weight % of antimony; from 0.01 to 0.25 weight % of manganese; and tin.

17 Claims, 7 Drawing Sheets

(51) Int. Cl.
- B23K 35/02 (2006.01)
- E21B 17/00 (2006.01)
- B23K 1/00 (2006.01)
- C22C 13/02 (2006.01)
- E21B 47/00 (2012.01)
- E21B 47/12 (2012.01)
- E21B 41/00 (2006.01)
- B23K 101/00 (2006.01)

(52) U.S. Cl.
CPC ...... *B23K 35/0222* (2013.01); *B23K 35/0244* (2013.01); *B23K 35/26* (2013.01); *C22C 13/02* (2013.01); *E21B 17/00* (2013.01); *E21B 41/00* (2013.01); *E21B 47/00* (2013.01); *E21B 47/12* (2013.01); *B23K 2101/002* (2018.08)

(58) Field of Classification Search
CPC ...... E21B 10/573; E21B 10/633; E21B 17/00; E21B 47/12
See application file for complete search history.

(56) References Cited

U.S. PATENT DOCUMENTS

| | | |
|---|---|---|
| 2002/0127136 A1 | 9/2002 | Takaoka et al. |
| 2007/0212817 A1 | 9/2007 | Sato et al. |
| 2010/0314176 A1* | 12/2010 | Zhang ................ E21B 10/573 |
| | | 175/383 |
| 2011/0268985 A1 | 11/2011 | Zhang et al. |
| 2012/0156512 A1 | 6/2012 | Nakano et al. |

OTHER PUBLICATIONS

Patel et al, U.S. Appl. No. 61/812,537, "High Temperature Solder for Downhole Components," filed Apr. 16, 2013.
Patel et al, U.S. Appl. No. 61/836,743, "High Temperature Solder for Downhole Components," filed Jun. 19, 2013.
International Search Report and Written Opinion in PCT/US2014/070145 dated Apr. 7, 2015; 13 pages.

* cited by examiner

TIN-ANTIMONY-BASED HIGH TEMPERATURE SOLDER FOR DOWNHOLE COMPONENTS

CROSS-REFERENCE TO RELATED APPLICATION

This application claims priority to U.S. Provisional Patent Application Ser. No. 61/915,879 filed on Dec. 13, 2013, the contents of which are incorporated herein for all purposes.

TECHNICAL FIELD

The present disclosure relates generally to metal alloys for use as solders in downhole applications. More specifically, the present disclosure relates to alloys based on tin and antimony (SnSb).

BACKGROUND INFORMATION

This section is intended to introduce the reader to various aspects of art that may be related to various aspects of the subject matter described and/or claimed below. This discussion is believed to be helpful in providing the reader with background information to facilitate a better understanding of the various aspects of the present disclosure. Accordingly, it should be understood that these statements are to be read in this light, not as admissions of prior art.

Solder is used to electrically and mechanically connect electrical components of downhole tools. For instance, solder can be used to join metal components, such as for connecting an electronic component, such as a microchip, controller, or multi-chip module, to a circuit board, such as a printed wiring board (PWA). Eutectic tin-lead solder has long been used for its reliability, availability, and cost effective advantages. For instance, some tin-lead solders may have melting points as high as 300 degrees centigrade (C). However, the Restriction of Hazardous Substances (RoHS) banned lead from electronics, thereby creating a need to develop lead-free alternatives to tin-lead solders.

Some attempts at finding alternatives for high temperature applications focused on tin-silver-copper alloys (also known as Sn—Ag—Cu alloys, or SAC alloys). SAC alloys typically have a melting point of between approximately 217 and 221 degrees C. However, as the melting point of SAC alloys is lower than traditional lead-based solders, their reliability becomes questionable under certain harsh environmental conditions, such as in drilling conditions where high temperature thermal fatigue is combined with high instances of mechanical shock and vibrations.

Subsequent attempts increased the silver content to reduce the creep rate of the SAC solder and thereby increase reliability when subjected to temperature aging and cycling. However, the long-term reliability of SAC alloys with high silver (Ag) content is also questionable under harsh environments, such as those inducing high temperature thermal fatigue and mechanical shock.

Accordingly, a lead-free solder having improved thermal and mechanical performance properties when compared to SAC alloys would be highly desirable.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed except where specifically noted as indicating a relationship.

Figure 1:
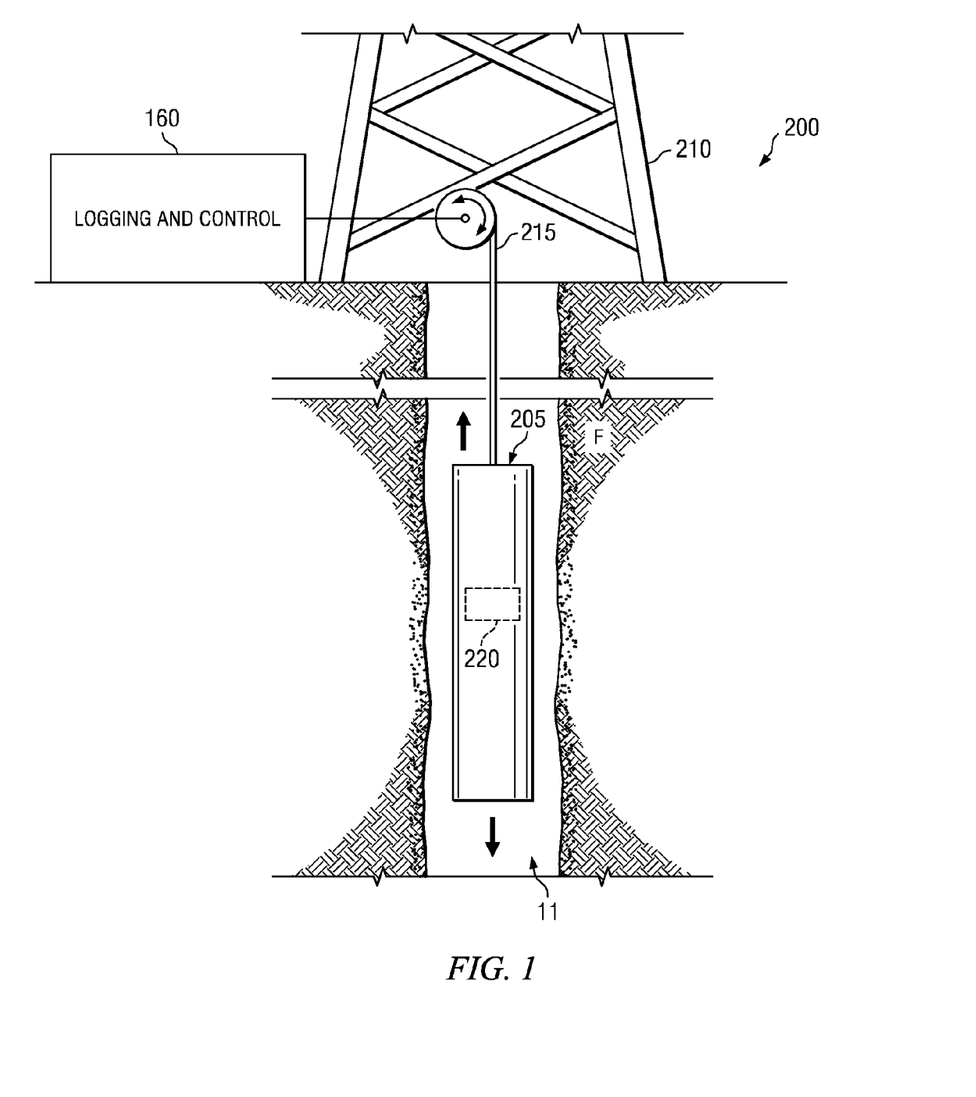
FIG. 1 is a schematic view of apparatus according to one or more aspects of the present disclosure.

FIG. 1 is a schematic view of an example wellsite system that may be employed onshore and/or offshore according to one or more aspects of the present disclosure. As depicted in FIG. 1, a downhole tool 205 may be suspended from a rig 210 in a wellbore 11 formed in one or more subterranean formations F. The downhole tool 205 may be or comprise an acoustic tool, a conveyance tool, a density tool, a downhole fluid analysis (DFA) tool, an electromagnetic (EM) tool, a fishing tool, a formation evaluation tool, a gravity tool, an intervention tool, a magnetic resonance tool, a monitoring tool, a neutron tool, a nuclear tool, a perforating tool, a photoelectric factor tool, a porosity tool, a reservoir characterization tool, a reservoir fluid sampling tool, a reservoir pressure tool, a reservoir solid sampling tool, a resistivity tool, a sand control tool, a seismic tool, a stimulation tool, a surveying tool, and/or a telemetry tool, although other downhole tools are also within the scope of the present disclosure. The downhole tool 205 may be deployed from the rig 210 into the wellbore 11 via a conveyance means 215, which may be or comprise a wireline cable, a slickline cable, and/or coiled tubing, although other means for conveying the downhole tool 205 within the wellbore 11 are also within the scope of the present disclosure. As the downhole tool 205 operates, outputs of any number and/or type(s) of the downhole tool 205 and/or components thereof (one of which is designated by reference numeral 220) may be sent via, for example, telemetry to a logging and control system 160 at surface, and/or may be stored in any number and/or type(s) of memory(ies) for subsequent recall and/or processing after the downhole tool 205 is retrieved to surface.

Figure 2:
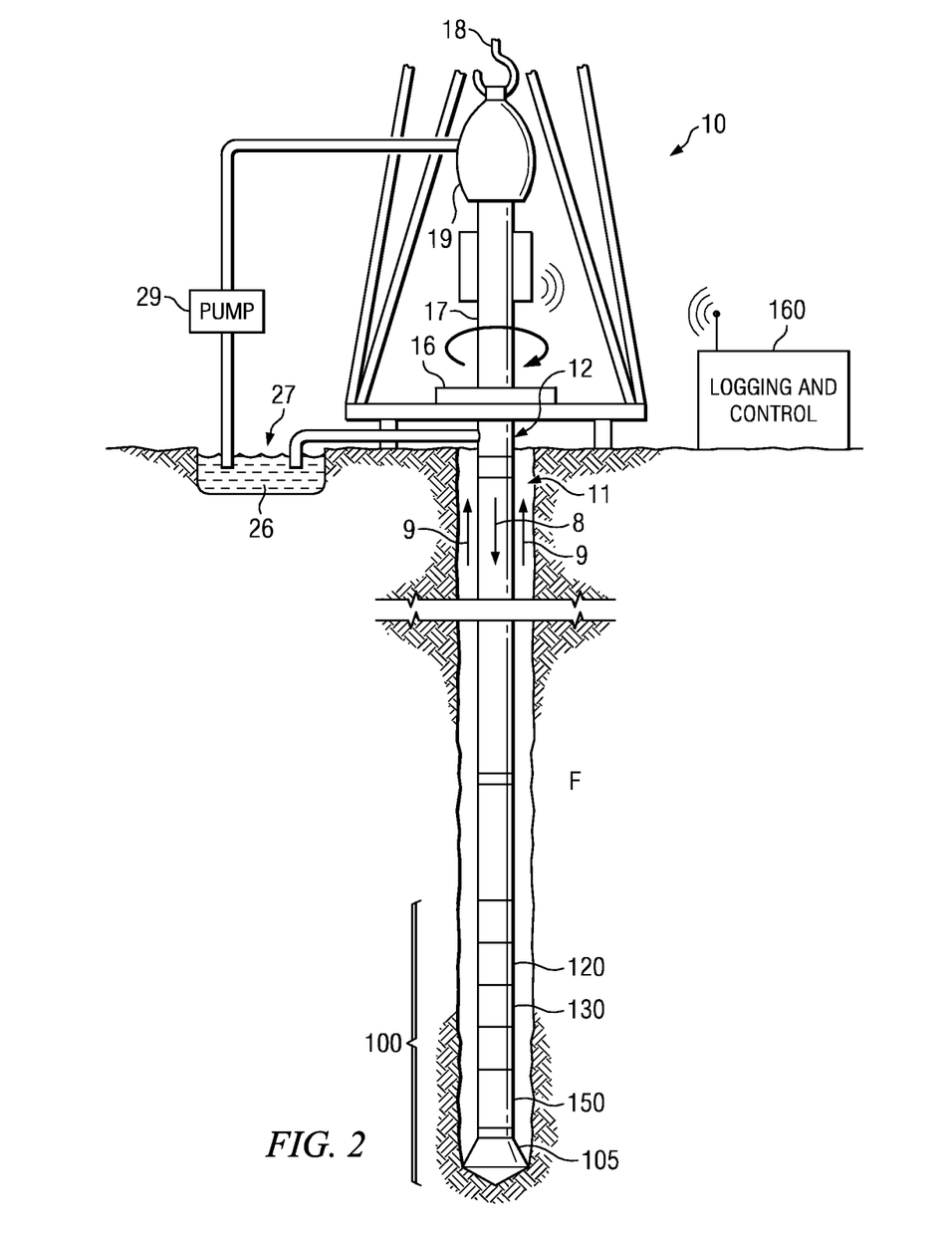
FIG. 2 is a schematic view of apparatus according to one or more aspects of the present disclosure.

FIG. 2 is a schematic view of an example wellsite system that can be employed onshore and/or offshore, perhaps including at the same wellsite as depicted in FIG. 1, where the wellbore 11 may have been formed in the one or more subsurface formations F by rotary and/or directional drilling. As depicted in FIG. 2, a conveyance means 12 suspended within the wellbore 11 may comprise or be connected to a bottom hole assembly (BHA) 100, which may have a drill bit 105 at its lower end. The conveyance means 12 may include drill pipe, wired drill pipe (WDP), tough logging conditions (TLC) pipe, coiled tubing, and/or other means of conveying the BHA 100 within the wellbore 11.

The surface system at the wellsite may comprise a platform and derrick assembly 10 positioned over the wellbore 11, where such derrick may be substantially similar or identical to the rig 210 shown in FIG. 1. The assembly 10 may include a rotary table 16, a kelly 17, a hook 18, and/or a rotary swivel 19. The conveyance means 12 may be rotated by the rotary table 16, energized by means not shown, which may engage the kelly 17 at the upper end of the conveyance means 12. The conveyance means 12 may be suspended from the hook 18, which may be attached to a traveling block (not shown), and through the kelly 17 and the rotary swivel 19, which permits rotation of the drillstring 12 relative to the hook 18. Additionally, or alternatively, a top drive system may be used.

The surface system may also include drilling fluid 26, which is commonly referred to in the industry as mud, stored in a pit 27 formed at the well site. A pump 29 may deliver the drilling fluid 26 to the interior of the conveyance means 12 via a port (not shown) in the swivel 19, causing the drilling fluid to flow downwardly through the conveyance means 12 as indicated by the directional arrow 8. The drilling fluid 26 may exit the conveyance means 12 via ports in the drill bit 105, and then circulate upwardly through the annulus region between the outside of the conveyance means 12 and the wall of the wellbore, as indicated by the directional arrows 9. The drilling fluid 26 may be used to lubricate the drill bit 105, carry formation cuttings up to the surface as it is returned to the pit 27 for recirculation, and/or create a mudcake layer (not shown) on the walls of the wellbore 11. Although not pictured, one or more other circulation implementations are also within the scope of the present disclosure, such as a reverse circulation implementation in which the drilling fluid 26 is pumped down the annulus region (i.e., opposite to the directional arrows 9) to return to the surface within the interior of the conveyance means 12 (i.e., opposite to the directional arrow 8).

The BHA 100 may include any number and/or type(s) of downhole tools, schematically depicted in FIG. 2 as tools 120, 130, and 150. Examples of such downhole tools include an acoustic tool, a density tool, a directional drilling tool, a DFA tool, a drilling tool, an EM tool, a fishing tool, a formation evaluation tool, a gravity tool, an intervention tool, a logging while drilling (LWD) tool, a magnetic resonance tool, a measurement while drilling (MWD) tool, a monitoring tool, a mud logging tool, a neutron tool, a nuclear tool, a perforating tool, a photoelectric factor tool, a porosity tool, a reservoir characterization tool, a reservoir fluid sampling tool, a reservoir pressure tool, a reservoir solid sampling tool, a resistivity tool, a seismic tool, a stimulation tool, a surveying tool, a telemetry tool, and/or a tough logging condition (TLC) tool, although other downhole tools are also within the scope of the present disclosure.

The downhole tools 120, 130, and/or 150 may be housed in a special type of drill collar, as it is known in the art, and may include capabilities for measuring, processing, and/or storing information, as well as for communicating with the other downhole tools 120, 130, and/or 150, and/or directly with surface equipment, such as the logging and control system 160. Such communication may utilize any conventional and/or future-developed two-way telemetry system, such as a mud-pulse telemetry system, a wired drill pipe telemetry system, an electromagnetic telemetry system, and/or an acoustic telemetry system, among others within the scope of the present disclosure. One or more of the downhole tools 120, 130, and/or 150 may also comprise an apparatus (not shown) for generating electrical power for use by the BHA 100. Example devices to generate electrical power include, but are not limited to, a battery system and a mud turbine generator powered by the flow of the drilling fluid.

According to one or more aspects of the present disclosure, the downhole tool 200 shown in FIG. 1, the downhole tool 220 shown in FIG. 1, and/or one or more of the downhole tools 120, 130, and/or 150 shown in FIG. 2 may comprise a first component, a second component, and a solder electrically and mechanically coupling the first and second components.

As discussed above, the need for lead-free solders has led to the use of some solder alloys based on tin-silver-copper (Sn—Ag—Cu, or SAC). Various proportions of SAC were attempted, such as Sn-1.0Ag-0.5Cu (SAC105), Sn-4.0Ag-0.5Cu (SAC405), and Sn-3.0Ag-0.5Cu (SAC305), and their reliability when subjected to temperature aging and cycling were assessed. While some proportions performed better than others in this regard, it was also found that as a whole, the long term reliability of SAC is questionable under harsh environments, particularly when subjected to mechanical shock and high temperature thermal fatigue.

It has been found that by further doping an SAC alloy with manganese (Mn) may improve its thermal and mechanical properties. As examples, an SAC alloy doped with manganese may include from 0.001 to 1.0 weight % of copper, from 2.5 to 4.0 weight % of silver, from 0.01 to 0.25 weight % of manganese, and tin, from 0.01 to 1.0 weight % of copper, from 2.5 to 3.5 weight % of silver, from 0.01 to 0.25 weight % of manganese, and tin, the solder comprises 0.48 weight % of copper, 2.99 weight % of silver, 0.17 weight % of manganese, and tin, and so forth. More details of SAC alloys that include manganese are disclosed in U.S. Patent Application No. 61/807,193 (the '193 Application) entitled "High Temperature Solder for Downhole Components" filed on Apr. 1, 2013, U.S. Patent Application No. 61/812,537 (the '537 Application) entitled "High Temperature Solder for Downhole Components" filed on Apr. 16, 2013, and U.S. Patent Application No. 61/836,743 (the '743 Application) entitled "High Temperature Solder for Downhole Components" filed on Jun. 19, 2013, all of which are incorporated by reference herein.

In general, it was believed that in at least some instances, the addition of manganese improved the mechanical properties of tin-based alloys, such as SAC (e.g., improved reliability with respect to mechanical shock and/or high temperature cycling). However, it was noted that the addition of manganese does not increase the melting point of SAC, which is typically between approximately 217 to 221 degrees C., and thus noticeably lower than the higher melting points of some traditional lead-based solders (e.g., tin-lead alloys with a melting point of approximately 300 degrees C.). Because downhole conditions encountered during drilling operations can include high temperatures and pressures, as well as excessive shock and vibrations, it would be useful to have a solder that exhibits thermal performance properties that exceed that of SAC-based solders.

Figure 12:
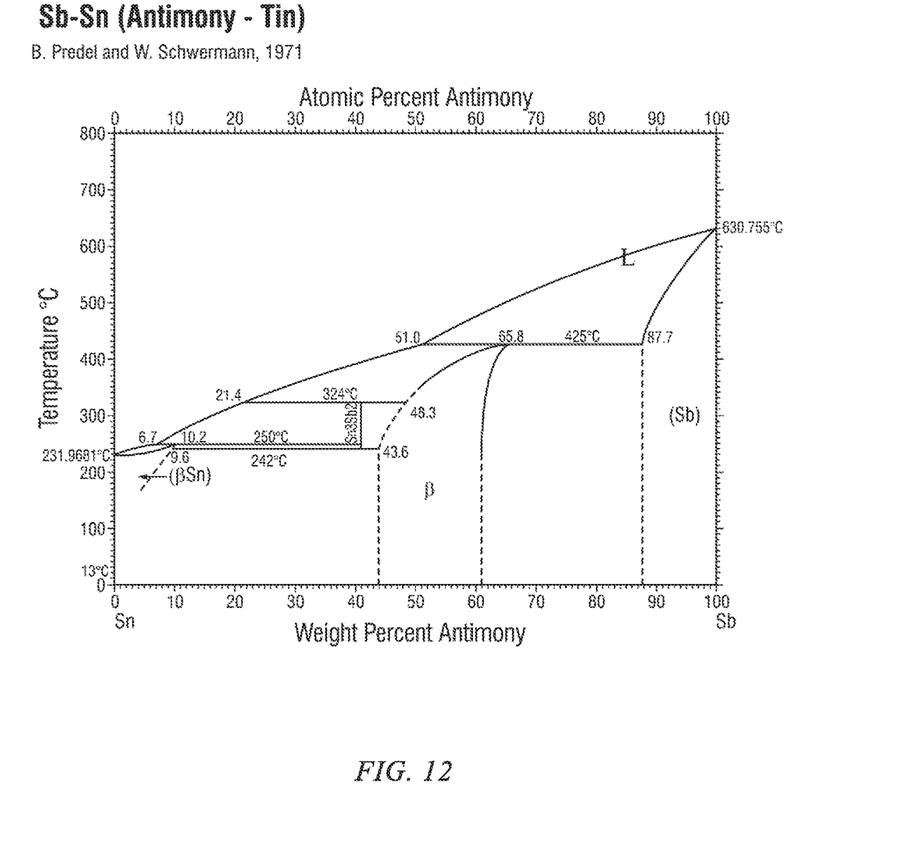
FIG. 12 is a graph illustrating a phase diagram of antimony—tin alloys.

One type of solder compound that has also been explored is based on tin (Sn) and antimony (Sb). In general, it is has been found that tin-antimony alloys exhibit a higher melting point than SAC alloys. For instance, referring to FIG. 12, Sn90Sb10 (approximately 10% antimony, 90% tin) has a melting point of approximately 242 degrees C.

When compared to SAC, tests conducted on Sn90Sb10 on downhole test vehicle boards were found to exhibit better isothermal temperature performance and shock performance in environmental tests, though performance under thermal cycling conditions showed about the same performance or little improvement. Scanning electron microscope (SEM) analysis on the component lead side showed voids along the intermetallic compound interface ($Cu_6Sn_5/Sn_{59}Cu_{33}Sb_5Fe_3$) and cracks in $SnSb_7$ and $SnSb_{43}$ beta phase after thermal cycling tests. This was found to be suggestive that a dopant could be added to improve thermal-mechanical properties of SbSn alloys during thermal cycling. It is noted that in these tests, the electroless nickel immersion gold (ENIG) plating of the printed wiring boards on which the tests were conducted, no issues were found with respect to the intermetallic compound.

Embodiments of the present disclosure introduce a SbSn alloy doped with manganese. Referring still to FIGS. 1 and 2, in accordance with one or more aspects of the present disclosure, the downhole tool 200 shown in FIG. 1, the downhole tool 220 shown in FIG. 1, and/or one or more of the downhole tools 120, 130, and/or 150 shown in FIG. 2 may include a first component, a second component, and a solder electrically and mechanically coupling the first and second components.

The solder may comprise from 0.01 to 0.25 weight % of manganese, from between approximately 5 to 15 weight % of antimony, and tin. For example, in one implementation within the scope of the present disclosure, the solder may comprise from 0.01 to 0.25 weight % of manganese, from 9 to 11 weight % of antimony, and tin. In another implementation within the scope of the present disclosure, the solder may comprise from 0.01 to 0.25 weight % of manganese, from 9.6 to 10.2 weight % of antimony, and tin. In another implementation within the scope of the present disclosure, the solder may comprise from 0.01 to 0.1 weight % of manganese, from 9 to 11 weight % of antimony, and tin. In another implementation within the scope of the present disclosure, the solder may comprise from 0.01 to 0.1 weight % of manganese, approximately 10 weight % of antimony, and tin. In another implementation within the scope of the present disclosure, the solder may comprise from 0.01 to 0.1 weight % of manganese, from 9.6 to 10.2 weight % of antimony, and tin, such that the solder comprises no other materials (with the possible exception of unavoidable impurities, contaminants, and the like). In another implementation within the scope of the present disclosure, the solder may comprise from 0.01 to 0.25 weight % of manganese, from 9.6 to 10.2 weight % of antimony, and tin, such that the solder comprises no other materials (with the possible exception of unavoidable impurities, contaminants, and the like). In another implementation within the scope of the present disclosure, the solder may comprise 0.2 weight % of manganese, from 9.6 to 10.2 weight % of antimony, and tin, such that the solder comprises no other materials (with the possible exception of unavoidable impurities, contaminants, and the like). In another implementation within the scope of the present disclosure, the solder may comprise 0.15 weight % of manganese, from 9.6 to 10.2 weight % of antimony, and tin, such that the solder comprises no other materials (with the possible exception of unavoidable impurities, contaminants, and the like).

The solder may have a melting point of at least about 150° C. For example, the solder may have a melting point of at least about 175° C. In one or more implementations within the scope of the present disclosure, the solder may have a melting point of at least about 200° C. In one or more implementations within the scope of the present disclosure, the solder may have a melting point of at least about 215° C. In one or more implementations within the scope of the present disclosure, the solder may have a melting point of at least about 230° C. In one or more implementations within the scope of the present disclosure, the solder may have a melting point of at least about 242° C. In one or more implementations within the scope of the present disclosure, the solder may have a melting point ranging between about 240° C. and about 250° C.

Figure 3:
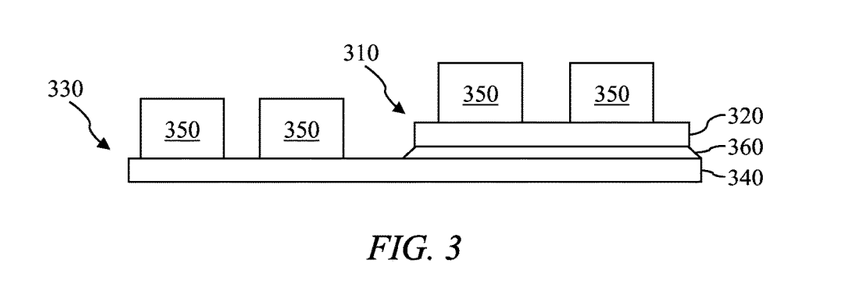
FIG. 3 is a schematic view of apparatus according to one or more aspects of the present disclosure.

In the example implementation shown in FIG. 3, the first component 310 is (or comprises) a substrate 320, and the second component 330 is (or comprises) a substrate 340. Each of the substrates 320 and 340 may carry one or more electrical components or devices, generally designated by reference numeral 350 in FIG. 3. Solder 360, which may be as described above, may be utilized to mechanically and electronically connect surfaces of the substrates 320 and 340. The solder 360 may be applied as a liquid, solid, or paste. The first component substrate 320 and/or the second component substrate 340 may have surface finishes formed using one or more of electroplated nickel/gold, electroless nickel immersion gold (ENIG), organic solderability preservatives (OSP), immersion silver, and/or immersion tin, although others are also within the scope of the present disclosure. The first component substrate 320 and/or the second component substrate 340 may comprise epoxy, bulk silicon, strained silicon, silicon germanium, and/or other materials, and may also be or comprise a silicon-on-insulator (SOI) substrate, such as a silicon-on-sapphire substrate, a silicon germanium-on-insulator substrate, and/or another substrate comprising an epitaxial semiconductor layer on an insulator layer. The first component substrate 320 and/or the second component substrate 340 may have a <100>, <110>, <111>, or other surface orientation.

Figure 4:
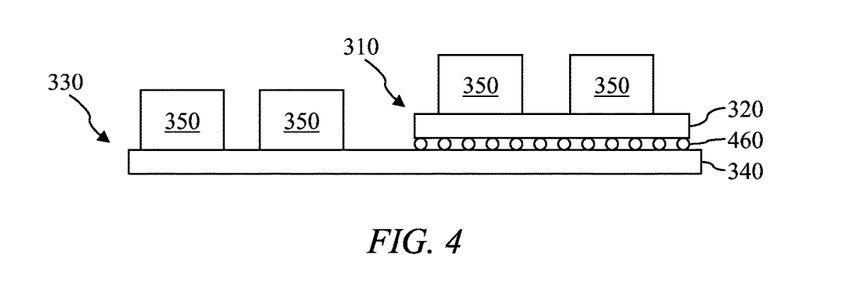
FIG. 4 is a schematic view of apparatus according to one or more aspects of the present disclosure.
Figure 5:
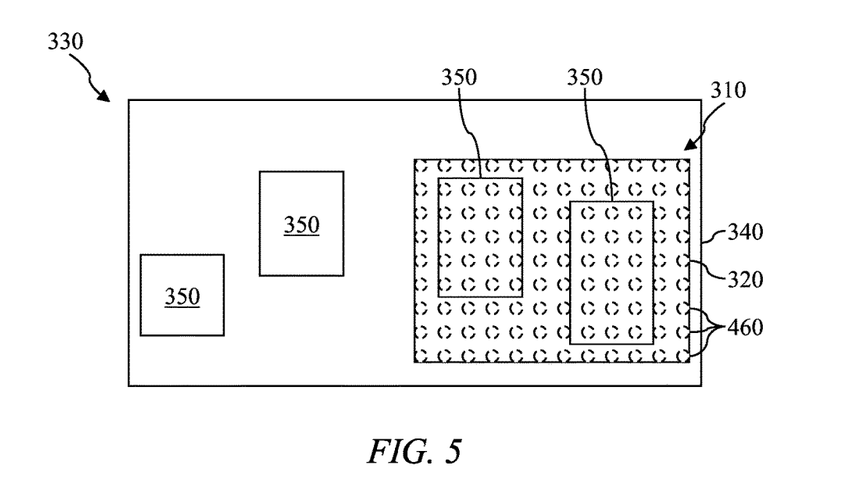
FIG. 5 is a schematic view of apparatus according to one or more aspects of the present disclosure.

In a similar implementation shown in FIG. 4, a plurality of solder balls 460 are utilized instead of (or even in addition to) the solder 360 shown in FIG. 3. For example, the solder balls 460 may be utilized as a 12×9 (or other size) ball grid array (BGA), as more clearly depicted in the example implementation of FIG. 5. Each solder ball; 460 in the BGA may comprise about 50 mg of solder, although other amounts are also within the scope of the present disclosure.

Figure 6:
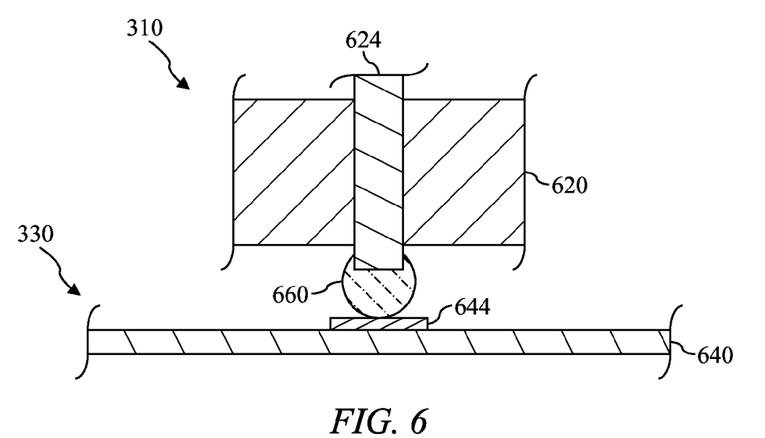
FIG. 6 is a schematic view of apparatus according to one or more aspects of the present disclosure.

Another example implementation within the scope of the present disclosure is shown in FIG. 6, in which the first component 310 comprises a component housing 620 and a connector rod/pin 624, the second component 330 comprises a conductor plate 644 attached to a circuit board or other substrate 640 (which may be substantially similar to one or more of the substrates described above), and a solder ball 660 comprising the solder described above connects the connector rod/pin 624 to the conductor plate 644. The solder ball 660 may be one solder ball of a BGA comprising a plurality of substantially similar solder balls. Prior to connecting the first component 310 to the substrate 640 of the second component 330, the solder ball 660 may be soldered onto the connector rod/pin 624. The first component 310 may then be positioned onto the substrate 640 of the second component 330, and sufficient heating may be applied to the solder ball 660 for it to adhere to the conductor plate 644. However, other processes comprising these and/or other steps, including in an order or sequence other than described above, are also within the scope of the present disclosure.

Figure 7:
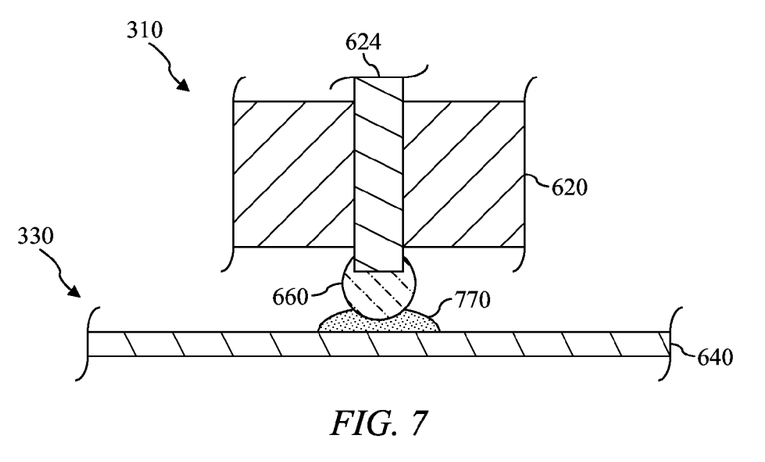
FIG. 7 is a schematic view of apparatus according to one or more aspects of the present disclosure.

Implementations within the scope of the present disclosure may also comprise utilizing an electrically conductive adhesive to connect the first and second components. In such implementations, the flexible nature of the adhesive may compensate for stresses and shock, such as by thermal expansion, and may prevent cracking or dislodging of the first and second components relative to one another. For example, as shown in FIG. 7, an electrically conducting adhesive 770 may be applied between the solder ball 660 and the substrate 640 of the second component 330. The adhesive 770 may be utilized instead of or in additional to the conductor plate 644 shown in FIG. 6. The adhesive 770 may comprise any conducting adhesive (including the conduction of electricity and/or thermal energy), and may comprise room temperature vulcanization (RTV), as well as metal-based adhesives such as silver conducting RTV, silver conducting adhesive, silver conducting epoxy, gold conducting adhesive, and gold conducting epoxy, among others within the scope of the present disclosure.

In the example implementations depicted in FIGS. 6 and 7, among others within the scope of the present disclosure, the first component 310 may be an electrical component and the second component 330 may be or comprise a substrate, a circuit board, a printed circuit board (PCB), a hybrid board, a multi-chip module, and/or a connector (e.g., a terminal). For example, the first component 310 may be or comprise one or more of an analog-to-digital converter, an antenna, a capacitor, a charge pump, a connector, a controller, a cooling component, a digital logic gate, a digital-to-analog converter, a diode, a heating component, an inductor, an integrated circuit (IC) chip, a memory, a microelectromechanical system (MEMS), a microprocessor, a mixer, an operational amplifier, an oscillator, a programmable logic device (PLD), a receiver, a resistor, a sensor, a state machine, a switch, a temperature control component, a terminal, a transceiver, a transformer, a transistor, a voltage converter, a voltage reference, and/or another electrical device.

Figure 8:
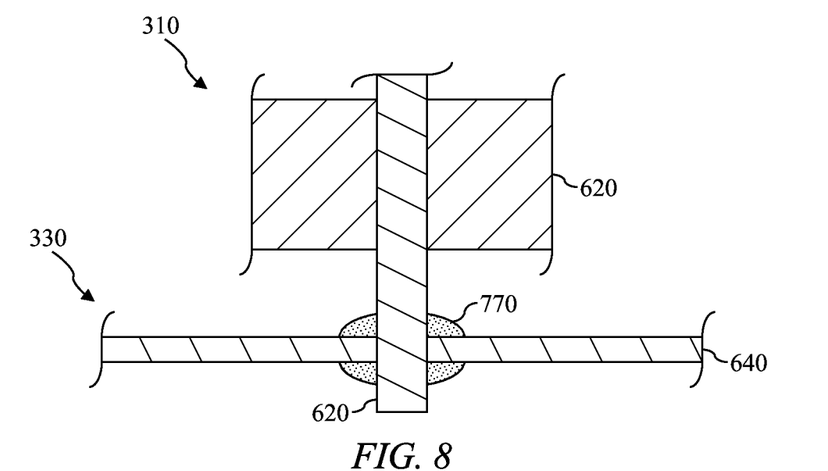
FIG. 8 is a schematic view of apparatus according to one or more aspects of the present disclosure.

FIG. 8 is a schematic view of another implementation within the scope of the present disclosure that is similar to those shown in FIGS. 6 and 7, in which the first component 310 comprises one or more connector rods/pins 624 extending through the substrate 640 of the second component 330. For example, apertures may be formed through the substrate 640 to accommodate the connector rods/pins 624 passing therethrough. Optionally the electrically conducting adhesive 770 may be applied along the outer surface of the connector rods/pins 624 where they intersect the substrate 640.

Figure 9:
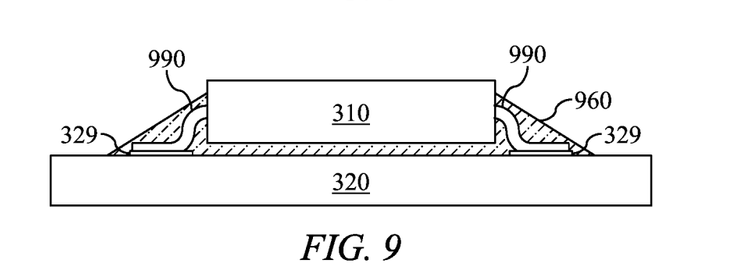
FIG. 9 is a schematic view of apparatus according to one or more aspects of the present disclosure.

FIG. 9 is a schematic view of another implementation within the scope of the present disclosure, in which the first component 310 is a surface mount component, the second component 320 is a substrate, and the first component 310 is mechanically and electrically coupled to the second component 320 by solder 960. The solder 960 may be as described above. The first component 310 may, for example, be an IC chip having a plurality of lead terminals 990 each corresponding to one of a plurality of solder lands 329 at the surface of the second component 320. Each of the lead terminals 990 of the first component 310 may be electrically connected with the corresponding solder land 329 of the second component 320 via the solder 960. The solder 960 and/or an under-fill material (not shown) may also fill the gap between the first component 310 and the second component 320, perhaps surrounding all or a portion of one or more of the lead terminals 990. For example, although the implementation depicted in FIG. 9 reflects the first component 310 being submerged in the solder 960, other implementations within the scope of the present disclosure may comprise a smaller amount of the solder 960, such that the first component 310 may not be submerged, partially submerged, or submerged at all in the solder 960.

Figure 10:
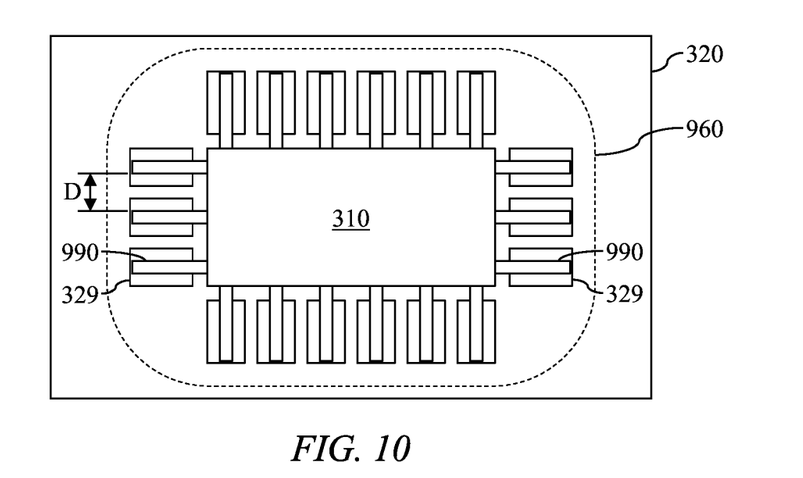
FIG. 10 is a schematic view of apparatus according to one or more aspects of the present disclosure.

The first component 310 may be a fine pitch surface mount technology (SMT) IC chip, as shown in the plan view of FIG. 10. (In FIG. 10, the solder 960 is shown in phantom for the sake of clarity.) The distance "D" between adjacent lead terminals 990 may range between about 0.5 mm and about 1.0 mm, although other value are also within the scope of the present disclosure. The first component 310 may be a Thin Quad Flat Package (TQFP), a Plastic Quad Flat Package (PQFP), and the like. The lead terminals 990 may substantially comprise copper or a copper alloy. For example, the lead terminals 990 may comprise CDA725 (Cu—Ni—Sn). The solder lands 329 may each be or comprise a solder pad, such as a tin solder pad and the like. The solder 960 may have a higher melting point than the high temperature environment that may be used for connecting the lead terminals 990 with the solder pads 329. For example, the solder 960 may have a melting point equal to or higher than about 200 degrees centigrade.

Figure 11:
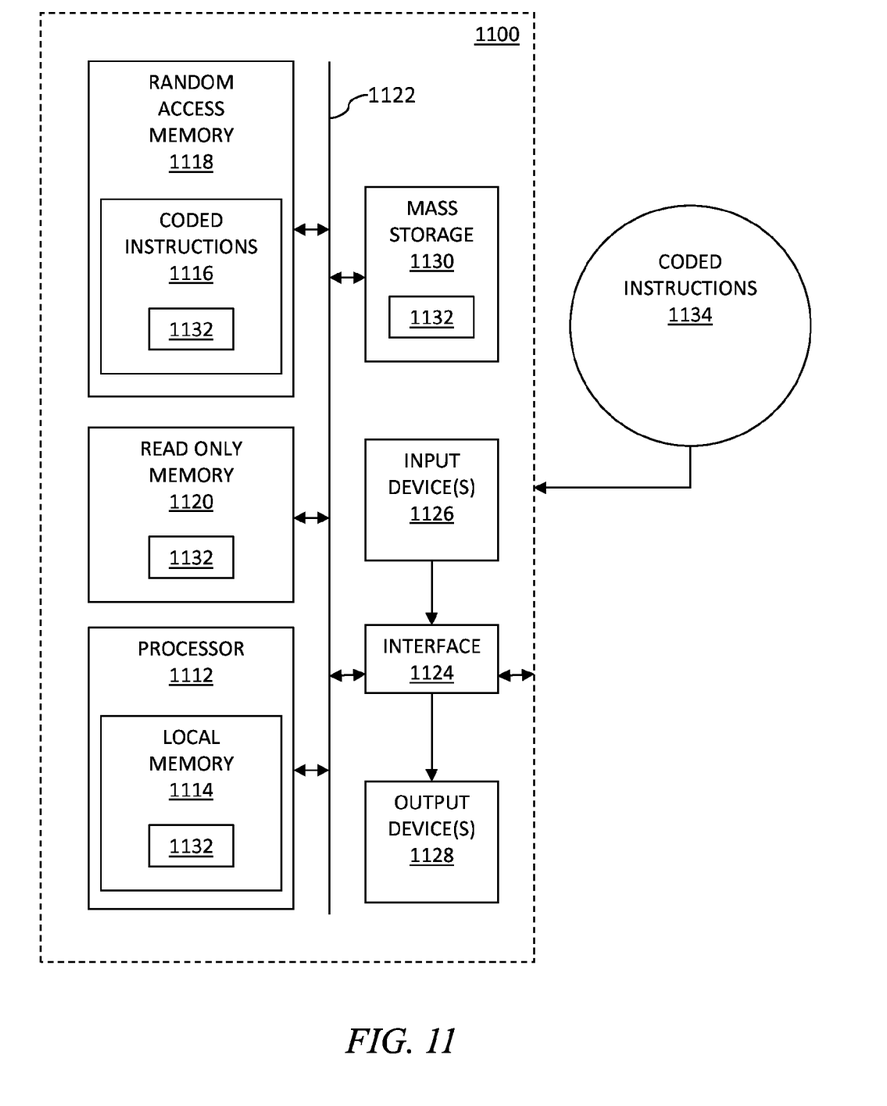
FIG. 11 is a schematic view of apparatus according to one or more aspects of the present disclosure.

FIG. 11 is a block diagram of an example processing system 1100 that may execute example machine-readable instructions used to implement one or more of the methods and/or processes described herein, and/or to implement the example downhole tools described herein. The processing system 1100 may be or comprise, for example, one or more processors, one or more controllers, one or more special-purpose computing devices, one or more servers, one or more personal computers, one or more personal digital assistant (PDA) devices, one or more smartphones, one or more internet appliances, and/or any other type(s) of computing device(s). One or more of the components of the example processing system 1100 may be assembled utilizing the above described solder, perhaps as shown in one or more of FIGS. 3-10, among other solder coupling methods within the scope of the present disclosure.

The system 1100 comprises a processor 1112 such as, for example, a general-purpose programmable processor. The processor 1112 includes a local memory 1114, and executes coded instructions 1132 present in the local memory 1114 and/or in another memory device. The processor 1112 may execute, among other things, machine-readable instructions to implement the methods and/or processes described herein. The processor 1112 may be, comprise or be implemented by any type of processing unit, such as one or more INTEL microprocessors, one or more microcontrollers from the ARM and/or PICO families of microcontrollers, one or more embedded soft/hard processors in one or more FPGAs, etc. Of course, other processors from other families are also appropriate.

The processor 1112 is in communication with a main memory including a volatile (e.g., random access) memory 1118 and a non-volatile (e.g., read only) memory 1120 via a bus 1122. The volatile memory 1118 may be, comprise or be implemented by static random access memory (SRAM), synchronous dynamic random access memory (SDRAM), dynamic random access memory (DRAM), RAMBUS dynamic random access memory (RDRAM) and/or any other type of random access memory device. The non-volatile memory 1120 may be, comprise or be implemented by flash memory and/or any other desired type of memory device. One or more memory controllers (not shown) may control access to the main memory 1118 and/or 1120.

The processing system 1100 also includes an interface circuit 1124. The interface circuit 1124 may be, comprise or be implemented by any type of interface standard, such as an Ethernet interface, a universal serial bus (USB) and/or a third generation input/output (3GIO) interface, among others.

One or more input devices 1126 are connected to the interface circuit 1124. The input device(s) 1126 permit a user to enter data and commands into the processor 1112. The input device(s) may be, comprise or be implemented by, for example, a keyboard, a mouse, a touchscreen, a track-pad, a trackball, an isopoint and/or a voice recognition system, among others.

One or more output devices 1128 are also connected to the interface circuit 1124. The output devices 1128 may be, comprise or be implemented by, for example, display devices (e.g., a liquid crystal display or cathode ray tube display (CRT), among others), printers and/or speakers, among others. Thus, the interface circuit 1124 may also comprise a graphics driver card.

The interface circuit 1124 also includes a communication device such as a modem or network interface card to facilitate exchange of data with external computers via a network (e.g., Ethernet connection, digital subscriber line (DSL), telephone line, coaxial cable, cellular telephone system, satellite, etc.).

The processing system 1100 also includes one or more mass storage devices 1130 for storing machine-readable instructions and data. Examples of such mass storage devices 1130 include floppy disk drives, hard drive disks, compact disk drives and digital versatile disk (DVD) drives, among others.

The coded instructions 1132 may be stored in the mass storage device 1130, the volatile memory 1118, the non-volatile memory 1120, the local memory 1114 and/or on a removable storage medium, such as a CD or DVD 1134.

As an alternative to implementing the methods and/or apparatus described herein in a system such as the processing system of FIG. 11, the methods and or apparatus described herein may be embedded in a structure such as a processor and/or an ASIC (application specific integrated circuit).

In view of all of the above, and FIGS. 1-11, a person of ordinary skill in the art will readily recognize that the present disclosure introduces an apparatus comprising: a downhole tool conveyable within a wellbore extending into a subterranean formation, wherein the downhole tool comprises: a first component; a second component; and a solder electrically and mechanically coupling the first and second components, wherein the solder comprises: from approximately 9.6 to 10.2 percent, based on total weight of the solder, of antimony; from approximately 0.01 to 0.25 percent, based on total weight of the solder, of manganese; and tin. The solder may comprise: from approximately 9.9 to 10.1 percent, based on total weight of the solder, of antimony; from approximately 0.1 to 0.25 percent, based on total weight of the solder, of manganese; and tin. The solder may comprise: approximately 10 percent, based on total weight of the solder, of antimony; from approximately 0.15 to 0.2 percent, based on total weight of the solder, of manganese; and tin.

The solder may have a melting point of at least about 150° C. The solder may have a melting point of at least about 175° C. The solder may have a melting point of at least about 200° C. The solder may have a melting point of at least about 215° C. The solder may have a melting point of at least about 225° C. In one or more implementations within the scope of the present disclosure, the solder may have a melting point of at least about 230° C. In one or more implementations within the scope of the present disclosure, the solder may have a melting point of at least about 242° C. In one or more implementations within the scope of the present disclosure, the solder may have a melting point ranging between about 240° C. and about 250° C.

The first component may be or comprise a substrate and the second component may be or comprise an integrated circuit chip.

At least one of the first and second components may be or comprise at least a portion of at least one of: an analog-to-digital converter; an antenna; a capacitor; a charge pump; a connector; a controller; a cooling component; a digital logic gate; a digital-to-analog converter; a diode; a heating component; an inductor; an integrated circuit chip; a memory; a micro-electro-mechanical system (MEMS); a microprocessor; a mixer; an operational amplifier; an oscillator; a programmable logic device (PLD); a receiver; a resistor; a sensor; a state machine; a switch; a temperature control component; a terminal; a transceiver; a transformer; a transistor; a voltage converter; a voltage reference; and/or another electrical device.

The downhole tool may be or comprise at least one of: an acoustic tool; a conveyance tool; a density tool; a directional drilling tool; a downhole fluid analysis (DFA) tool; a drilling tool; an electromagnetic (EM) tool; a fishing tool; a formation evaluation tool; a gravity tool; an intervention tool; a logging while drilling (LWD) tool; a magnetic resonance tool; a measurement while drilling (MWD) tool; a monitoring tool; a mud logging tool; a neutron tool; a nuclear tool; a perforating tool; a photoelectric factor tool; a porosity tool; a reservoir characterization tool; a reservoir fluid sampling tool; a reservoir pressure tool; a reservoir solid sampling tool; a resistivity tool; a sand control tool; a seismic tool; a stimulation tool; a surveying tool; a telemetry tool; and/or a tough logging condition (TLC) tool.

The downhole tool may be conveyable within the wellbore by at least one of: coiled tubing; drill pipe; slickline; wired drill pipe (WDP); and/or wireline.

The downhole tool may be or comprise at least one of: a cased-hole tool; and/or an open-hole tool.

The present disclosure also introduces an apparatus for exploring for hydrocarbons in a subterranean formation, drilling to hydrocarbons in the subterranean formation, or producing hydrocarbons from the subterranean formation, comprising: an assembly comprising: at least a portion of a derrick or platform; and the apparatus described above suspended from the derrick or platform in a wellbore extending into the subterranean formation.

The present disclosure also introduces methods of manufacturing, using, repairing, and/or performing maintenance of such apparatus.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same aspects of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

What is claimed is:

1. An apparatus, comprising:
a downhole tool conveyable within a wellbore extending into a subterranean formation, wherein the downhole tool comprises:
a first component;
a second component; and
a solder electrically and mechanically coupling the first and second components, wherein the solder consists essentially of: antimony, manganese, and tin.

2. The apparatus of claim 1 wherein the solder consists essentially of:
from about 9.2 to about 10.8 percent, based on total weight of the solder, of antimony;
from about 0.01 to about 0.25 percent, based on total weight of the solder, of manganese; and tin.

3. The apparatus of claim 1 wherein the solder consists essentially of:
from about 9.6 to about 10.2 percent, based on total weight of the solder, of antimony;
from about 0.01 to about 0.25 percent, based on total weight of the solder, of manganese; and tin.

4. The apparatus of claim 1 wherein the solder consists essentially of:
from about 9 to about 11 percent, based on total weight of the solder, of antimony;
from about 0.1 to about 0.25 percent, based on total weight of the solder, of manganese; and tin.

5. The apparatus of claim 1 wherein the solder consists of:
from about 9.6 to about 10.2 percent, based on total weight of the solder, of antimony;
from about 0.1 to about 0.25 percent, based on total weight of the solder, of manganese; and tin.

6. The apparatus claim 1 wherein the downhole tool is or comprises at least one of: an acoustic tool; a conveyance tool; a density tool; a directional drilling tool; a downhole fluid analysis (DFA) tool; a drilling tool; an electromagnetic (EM) tool; a fishing tool; a formation evaluation tool; a gravity tool; an intervention tool; a logging while drilling (LWD) tool; a magnetic resonance tool; a measurement while drilling (MWD) tool; a monitoring tool; a mud logging tool; a neutron tool; a nuclear tool; a perforating tool; a photoelectric factor tool; a porosity tool; a reservoir characterization tool; a reservoir fluid sampling tool; a reservoir pressure tool; a reservoir solid sampling tool; a resistivity tool; a sand control tool; a seismic tool; a stimulation tool; a surveying tool; a telemetry tool; and/or a tough logging condition (TLC) tool.

7. The apparatus of claim 1, wherein the downhole tool is conveyable within the wellbore by at least one of: coiled tubing; drill pipe; slickline; wired drill pipe (WDP); and/or wireline.

8. The apparatus of claim 1, wherein the downhole tool is or comprises at least one of:
a cased-hole tool; and/or
an open-hole tool.

9. The apparatus of claim 1, wherein the solder consists essentially of:
from about 5 to about 9.6 percent, based on total weight of the solder, of antimony;
from about 0.01 to about 0.25 percent, based on total weight of the solder, of manganese; and tin.

10. The apparatus of claim 9, wherein the solder consists of:
from about 5 to about 9.6 percent, based on total weight of the solder, of antimony;
from about 0.01 to about 0.25 percent, based on total weight of the solder, of manganese; and tin.

11. The apparatus of claim 1, wherein the solder has a melting point of from about 240° C. to about 250° C.

12. The apparatus of claim 1, wherein the solder has a melting point of at least about 242° C.

13. An apparatus, comprising:
a downhole tool conveyable within a wellbore extending into a subterranean formation, wherein the downhole tool comprises:
a first component;
a second component; and
a solder electrically and mechanically coupling the first and second components, wherein the solder consists of:
from about 9 to about 11 percent, based on total weight of the solder, of antimony;
from about 0.01 to about 0.25 percent, based on total weight of the solder, of manganese; and tin.

14. The apparatus of claim 13 wherein the solder consists of:
from about 9.2 to about 10.8 percent, based on total weight of the solder, of antimony;
from about 0.01 to about 0.25 percent, based on total weight of the solder, of manganese; and tin.

15. The apparatus of claim 13 wherein the solder consists of:
from about 9.6 to about 10.2 percent, based on total weight of the solder, of antimony;
from about 0.01 to about 0.25 percent, based on total weight of the solder, of manganese; and tin.

16. The apparatus of claim 13, wherein the solder has a melting point of from about 240° C. to about 250° C.

17. The apparatus of claim 13, wherein the solder has a melting point of at least about 242° C.

* * * * *